United States Patent
Niedenzu et al.

(10) Patent No.: US 10,294,343 B2
(45) Date of Patent: May 21, 2019

(54) MATERIALS WITH ENHANCED PROTECTION OF LIGHT SENSITIVE ENTITIES

(71) Applicant: THE CHEMOURS COMPANY TT LLC, Harrisburg, PA (US)

(72) Inventors: Philipp Martin Niedenzu, Wilmington, DE (US); Denise Conner, Newark, DE (US); Divya Chopra, Kingston (CA)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 7 days.

(21) Appl. No.: 14/860,736

(22) Filed: Sep. 22, 2015

(65) Prior Publication Data

US 2016/0083554 A1 Mar. 24, 2016

Related U.S. Application Data (60) Provisional application No. 62/054,425, filed on Sep. 24, 2014.

(51) Int. Cl.
  *C08K 3/22* (2006.01)
  *C08K 3/26* (2006.01)
  *B65D 81/30* (2006.01)
(52) U.S. Cl.
  CPC ............... *C08K 3/22* (2013.01); *B65D 81/30* (2013.01); *C08K 3/26* (2013.01); *C08K 2003/2241* (2013.01); *C08K 2003/265* (2013.01); *C08K 2201/005* (2013.01)

(58) Field of Classification Search
  CPC ...... C08K 3/22; C08K 3/26; C08K 2201/005; C08K 2003/2241; C08K 2003/265; B65D 81/30
  See application file for complete search history.

(56) References Cited

U.S. PATENT DOCUMENTS

| | | |
|---|---|---|
| 3,409,454 A | 11/1968 | Andrew |
| 3,537,870 A | 11/1970 | Grohmann et al. |
| 5,277,970 A | 1/1994 | Schuhmann et al. |
| 5,384,169 A | 1/1995 | Waschinski et al. |
| 5,776,592 A | 7/1998 | Benhayoun et al. |
| 6,086,668 A | 7/2000 | Farneth et al. |

(Continued)

FOREIGN PATENT DOCUMENTS

| | | |
|---|---|---|
| BE | 1004565 A1 | 12/1992 |
| CN | 1245748 A1 | 3/2000 |

(Continued)

OTHER PUBLICATIONS

Author Unknown; Dec. 20, 2013; Plastics Technology; Knowledge Center: Plastics Feeding; Calcium Carbonate in Plastics Compounding; Retrieved from the Internet Archive.*

(Continued)

*Primary Examiner* — Nathan L Van Sell (57) ABSTRACT

The present invention is based on a surprising discovery of new packaging materials used to package substances, such as foods, preventing the photo-oxidation of entities found in these substances. Specifically, these new packaging materials include a mixture of polymer resins having novel and specific ratios of filler, preferably calcium carbonate, and titanium dioxide resulting in the material having unexpected properties.

15 Claims, 10 Drawing Sheets

(56) References Cited

U.S. PATENT DOCUMENTS

| | | |
|---|---|---|
| 6,146,556 A | 11/2000 | Katoot |
| 6,207,242 B1 | 3/2001 | Hoffman |
| 6,211,500 B1 | 4/2001 | Cochran, II et al. |
| 6,667,360 B1 | 12/2003 | Ng et al. |
| 6,761,969 B2 | 7/2004 | Li et al. |
| 6,881,937 B2 | 4/2005 | Swiontek |
| 7,033,677 B2 | 4/2006 | Busch et al. |
| 7,329,460 B2 | 2/2008 | Penttinen et al. |
| 7,638,113 B2 | 12/2009 | Bucher et al. |
| 7,795,330 B2 | 9/2010 | Birmingham et al. |
| 8,114,377 B2 | 2/2012 | Eaton et al. |
| 8,461,075 B2 | 6/2013 | Watanabe et al. |
| 8,604,116 B2 * | 12/2013 | Siegl ............ B29C 49/08 524/413 |
| 8,663,380 B2 | 3/2014 | Akhtar et al. |
| 2004/0038026 A1 | 2/2004 | Li et al. |
| 2005/0196360 A1* | 9/2005 | Comte ............ A61K 8/29 424/59 |
| 2006/0160928 A1 | 7/2006 | Cleveland et al. |
| 2007/0063394 A1 | 3/2007 | Lepage |
| 2008/0182117 A1 | 7/2008 | Iwasa et al. |
| 2009/0111921 A1* | 4/2009 | Nakamura ........ C08L 33/06 524/211 |
| 2009/0258175 A1* | 10/2009 | Matsuoka ........ C08J 9/0061 428/36.5 |
| 2010/0034893 A1* | 2/2010 | Pfluecker ........ A61K 8/11 424/490 |
| 2010/0137493 A1 | 6/2010 | Tilton |
| 2010/0204379 A1 | 8/2010 | Pira |
| 2011/0115135 A1* | 5/2011 | Siegl ............ B29C 49/08 264/537 |
| 2011/0237723 A1 | 9/2011 | Yano et al. |
| 2012/0219494 A1 | 8/2012 | Musick |
| 2012/0258154 A1* | 10/2012 | Pfluecker ........ A61K 8/11 424/401 |
| 2012/0288437 A1 | 11/2012 | Musick et al. |
| 2013/0276671 A1 | 10/2013 | Musick et al. |
| 2013/0327476 A1 | 12/2013 | Weisman et al. |
| 2014/0023845 A1 | 1/2014 | Perez Hinojosa et al. |
| 2014/0070464 A1 | 3/2014 | Lin et al. |

FOREIGN PATENT DOCUMENTS

| | | |
|---|---|---|
| CN | 102876047 A1 | 1/2013 |
| CN | 102993541 A | 3/2013 |
| CN | 103013023 A | 4/2013 |
| DE | 3905545 | 8/1990 |
| EP | 0408971 | 1/1991 |
| EP | 0517109 | 12/1992 |
| EP | 0689926 | 1/1996 |
| EP | 1347010 | 9/2003 |
| EP | 1674256 | 6/2006 |
| JP | 198716356 | 1/1987 |
| JP | 1994263940 | 9/1994 |
| JP | 1996283495 | 10/1996 |
| JP | 2007044930 | 2/2007 |
| JP | 2013252645 | 12/2013 |
| KR | 100863478 | 10/2008 |
| KR | 100875245 | 12/2008 |
| SU | 1659435 | 6/1991 |
| WO | 199948775 | 9/1999 |
| WO | 199955766 | 11/1999 |
| WO | 200006462 | 2/2000 |
| WO | 200102485 | 1/2001 |
| WO | 200176976 | 10/2001 |
| WO | 2002068192 | 9/2002 |
| WO | 2003011698 | 2/2003 |
| WO | 2006030654 | 3/2006 |
| WO | 2007015120 | 2/2007 |
| WO | 2007027027 | 3/2007 |
| WO | 2007073109 | 6/2007 |
| WO | 2008077468 | 7/2008 |
| WO | 2010035820 | 4/2010 |
| WO | 2011016527 | 2/2011 |
| WO | 2013129668 | 6/2013 |
| WO | 2013162947 | 10/2013 |
| WO | 2013163421 | 10/2013 |
| WO | 2014099350 | 6/2014 |

OTHER PUBLICATIONS

International Search Report, PCT/US2015/051299, dated Nov. 26, 2015.

* cited by examiner

MATERIALS WITH ENHANCED PROTECTION OF LIGHT SENSITIVE ENTITIES

FIELD OF THE INVENTION

This invention relates to packages, including films having specific ratios of calcium carbonate and $TiO_2$ concentrations that significantly protect light sensitive entities from photo-oxidation.

BACKGROUND

The ability of packages to protect substances they cover is highly dependent on the materials used to design and construct the package (reference: Food Packaging and Preservation; edited M. Mathlouthi, ISBN: 0-8342-1349-4; Aspen publication; Copyright 1994; Plastic Packaging Materials for Food; Barrier Function, Mass Transport, Quality Assurance and Legislation: ISBN 3-527-28868-6; edited by O. G Piringer; A. L. Baner; Wiley-vch Verlag GmBH, 2000). Preferred packaging materials minimize the penetration of moisture, light, and oxygen often referred to as barrier characteristics.

Many packages have been developed with enhanced mechanical barrier characteristics including greater tensile strength, burst strength, stiffness, tear strength, flex resistance, blocking, and coefficient of friction. These packages are made of polymer matrices that are mostly responsible for providing strength to withstand physical stresses such as pressure, temperature, shear forces, and moisture permeability (by preventing cracks in a package). Minerals, including calcium carbonate, may be added to polymer matrices to further enhance the mechanical properties of materials. Calcium carbonate is known to enhance shrink reduction and improved the surface finish of packages (Functional Fillers for Plastics; ISBN-13 978-3-527-31054-8; edited by Marino Xanthos; copyright 2005 WILEY-VCH Verlag GmBH). Also, calcium carbonate is known to reduce the cost of a package by being used in place of more expensive plastic resins.

Light barrier characteristics of materials are typically determined by opacity measurements. "Opacity" is defined as a material through which little or no light is able to pass and is determined by light transmittance measurements. A material having higher light transmittance values will be considered to have lower opacity and vice versa. Most food packages are developed to be poor light transmitters preventing light to contact food and prevent food spoilage. Calcium carbonate, when added to material having a polymer matrix, is traditionally viewed as having little effect on enhancing the material's opacity or decreasing its light transmittance. However, there are minerals, other than calcium carbonate, that when added to such materials are known to greatly enhance the opacity of the material. Titanium dioxide is such a mineral that greatly decreases the light transmittance of a material and is frequently used in food packaging.

Optical properties of calcium carbonate and titanium dioxide have been well studied and may be described using color mixing laws (Principles of Color technology; $3^{rd}$ edition; Roy Berns; ISBN 0-471-19459-X; Copyright 2000, John Wiley and Sons. page 150) and the Kubelka-Munk theory (Kubelka, P. and F. Munk; Z. tech, Physik 31 (1930), 1-16). The Kulbelka-Munk theory teaches that opacity via visible light scattering, which is the function of titanium dioxide and calcium carbonate, is the result of refractive indices differences between the plastic medium and the mineral particles within the pigmentary size range of between 0.1 and 1.0 microns in diameter. A difference between the refractive index of the mineral blend and the plastic medium creates opportunities for opacity via light scattering. For example, the refractive index of calcium carbonate is near 1.59 at 547 nm and low density polyethylene (LDPE) is near 1.52 at 547 nm; delta of 0.7. Rutile titanium dioxide has a refractive index value of 2.61 at 547 nm and LDPE has a value of 1.52; difference of 1.09. Therefore, at equal concentrations, titanium dioxide provides an order of magnitude more opacity than calcium carbonate.

Packaging materials have been made that include mixtures of calcium carbonate and titanium dioxide. One example of such a material is described in a Japanese Patent Application No. Kokai 2013-252645 (P22013-252645A) teaching a package composition including calcium carbonate and titanium dioxide. Specifically, a method was taught of making a biaxial drawn multilayer polypropylene film for packaging having enhanced oxygen barrier properties. This multilayer package was described as having one polypropylene layer including from 3 to 15 mass % of calcium carbonate and from 0.5 to 3 mass % of titanium oxide. This patent application does not teach, or suggest, that calcium carbonate when added to a material will significantly increase the material's opacity. To enhance the shelf life of substances, including foods and pharmaceuticals, a need exists to identify new packaging materials having great light barrier characteristics enabling the protection of photo-oxidation sensitive entities present in such substances such as foods and pharmaceuticals.

SUMMARY OF INVENTION

The present invention is based on a surprising discovery of new packaging materials used to package substances, such as foods, preventing the photo-oxidation of entities found in these substances. Specifically, these new packaging materials include a mixture of polymer resins having novel and specific ratios of filler, preferably calcium carbonate, and an inorganic pigment, preferably titanium dioxide, resulting in the material having unexpected properties.

One embodiment of the present invention is a composition comprising: a melt processable resin; an inorganic pigment (preferably titanium dioxide); and filler (preferably calcium carbonate); wherein the composition comprises 16 parts filler to 1 part inorganic pigment by weight. The composition typically is dried to form a layer, package, or cover. Preferably the layer is greater than ten millimeters (mls). Another embodiment of the present invention is a composition comprising a melt processable resin, inorganic pigment (preferably titanium dioxide), and a filler (preferably calcium carbonate), wherein the composition comprises a range from 3 to 11 parts of filler to 1 part inorganic pigment by weight and the filler is greater than 16 weight percent of the composition.

The preferred packages of the present invention are thin walled cartons, for example milk cartons, having a thickness of 0.010 inches or greater, preferably between 0.010 and 0.040 inches, more preferably between 0.020 to 0.040 inches. The preferred packages typically have a TAPPI Opacity greater than 20, greater than 30, greater than 40, greater than 50, greater than 60, greater than 70, greater than 80 but less than 100. The TAPPI opacity of the packages of the present invention are typically in the range of 20 to 95, 30 to 95, 40 to 95, 50 to 95, 60 to 95, 70 to 95, and 80 to 95. The LPF values of the packages of the present invention are greater than 10, greater than 15, greater than 20, greater than 25, greater than 30, greater than 35, greater than 40, greater than 45, greater than 50, greater than 55, greater than 60, greater than 65, greater than 70, or greater than 75. The melt processable resin of the package is preferably selected from the group consisting of polyethylene, polypropylene, polystyrene, polyvinylchloride, polymethylacrylate, acrylonitrile butadiene styrene, polycarbonate, polyethylene terephthalate, polybutylene terephthalate, polyamide, polyphenylene sulfide, polyacetal and or blends thereof.

Another embodiment of the present invention is a method of protecting entities sensitive to photo-oxidation comprising: a) providing a package comprising a melt processable resin; an inorganic pigment (preferably titanium dioxide particles); and a filler (preferably calcium carbonate) wherein the composition comprises a range from 3 to 16 parts of filler to 1 part of inorganic pigment by weight having an opacity between 60 and 100; and b) covering an entity sensitive to photo-oxidation with the package whereas the package has an LPF value of greater than 40 and a thickness of 0.01 inch or greater.

DETAILED DESCRIPTION

It is to be understood that this invention is not limited to particular embodiments, which can, of course, vary. It is also to be understood that the terminology used herein is for the purpose of describing particular embodiments only, and is not intended to be limiting. Further, all publications referred to herein are incorporated by reference for the purpose cited to the same extent as if each was specifically and individually indicated to be incorporated by reference herein.

As used in this specification and the appended claims, terms in the singular and the singular forms "a," "an," and "the," for example, include plural referents unless the content clearly dictates otherwise. Thus, for example, reference to "$TiO_2$", "$TiO_2$ particle," "the $TiO_2$ particle," or "a $TiO_2$ particle" also includes a plurality of $TiO_2$ particles. Use of the term "a $TiO_2$ particle" also includes, as a practical matter, many molecules of those $TiO_2$ particles.

Additionally, as used herein, "comprising" is to be interpreted as specifying the presence of the stated features, integers, steps, or components as referred to, but does not preclude the presence or addition of one or more features, integers, steps, or components, or groups thereof. Thus, for example, a sample comprising a light sensitive entity may contain additional light sensitive entities, or other components, such as other non-light sensitive entities or nutrients. Additionally, the term "comprising" is intended to include examples encompassed by the terms "consisting essentially of" and "consisting of." Similarly, the term "consisting essentially of" is intended to include examples encompassed by the term "consisting of."

Measuring the Opacity of Materials

Figure 1:
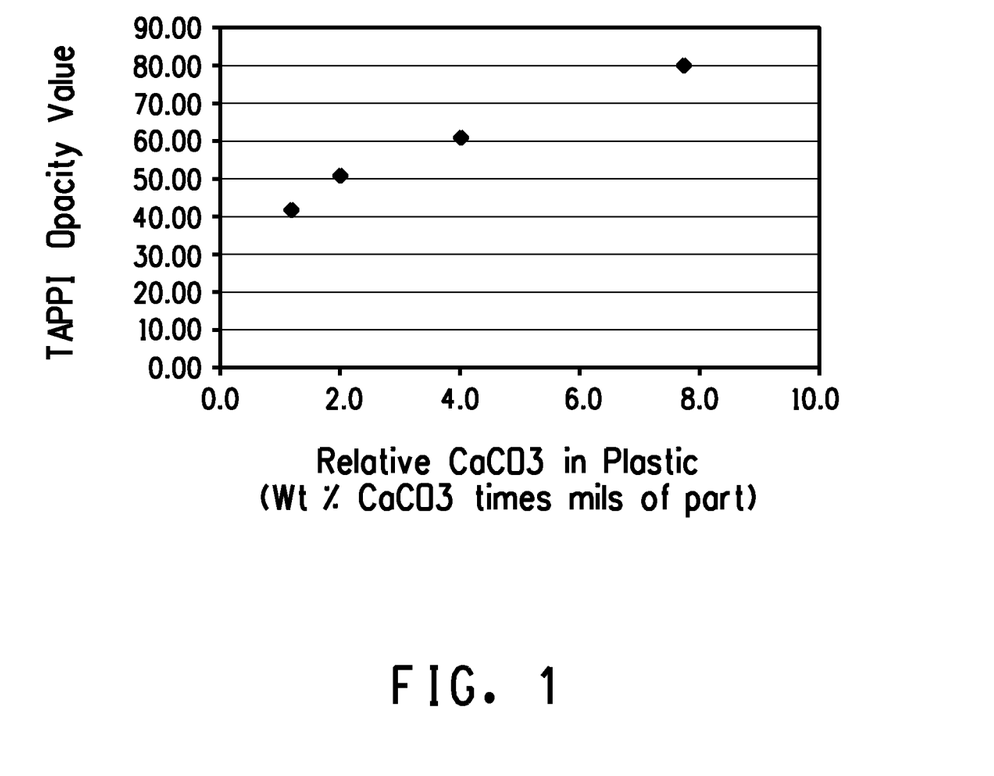
FIG. 1 illustrates TAPPI Opacity values of LDPE matrices with increasing amounts of calcium carbonate.
Figure 2:
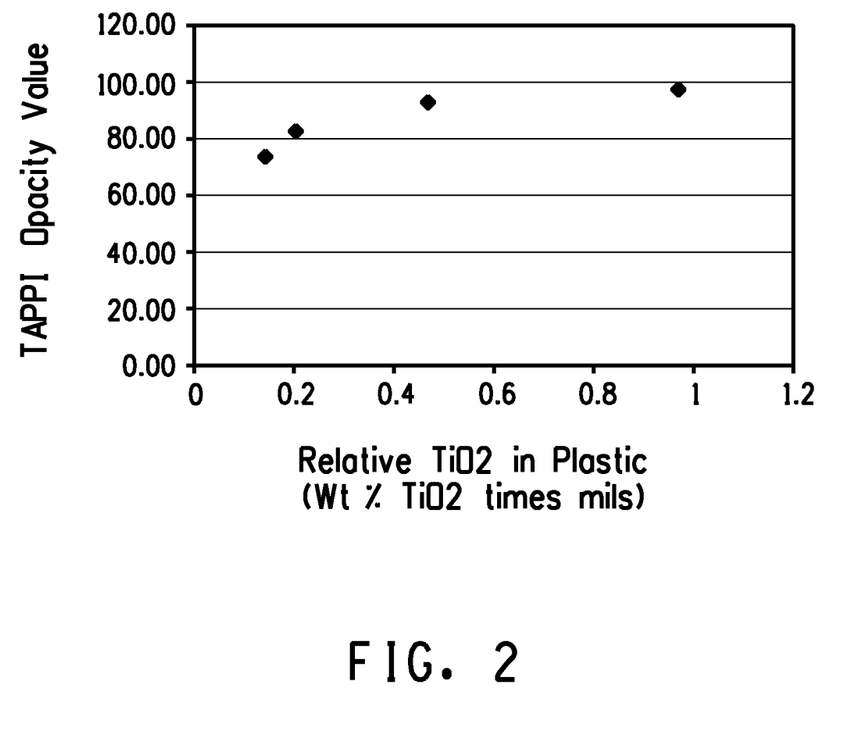
FIG. 2 illustrates TAPPI Opacity values of LDPE matrices with increasing amounts of titanium dioxide.
Figure 3:
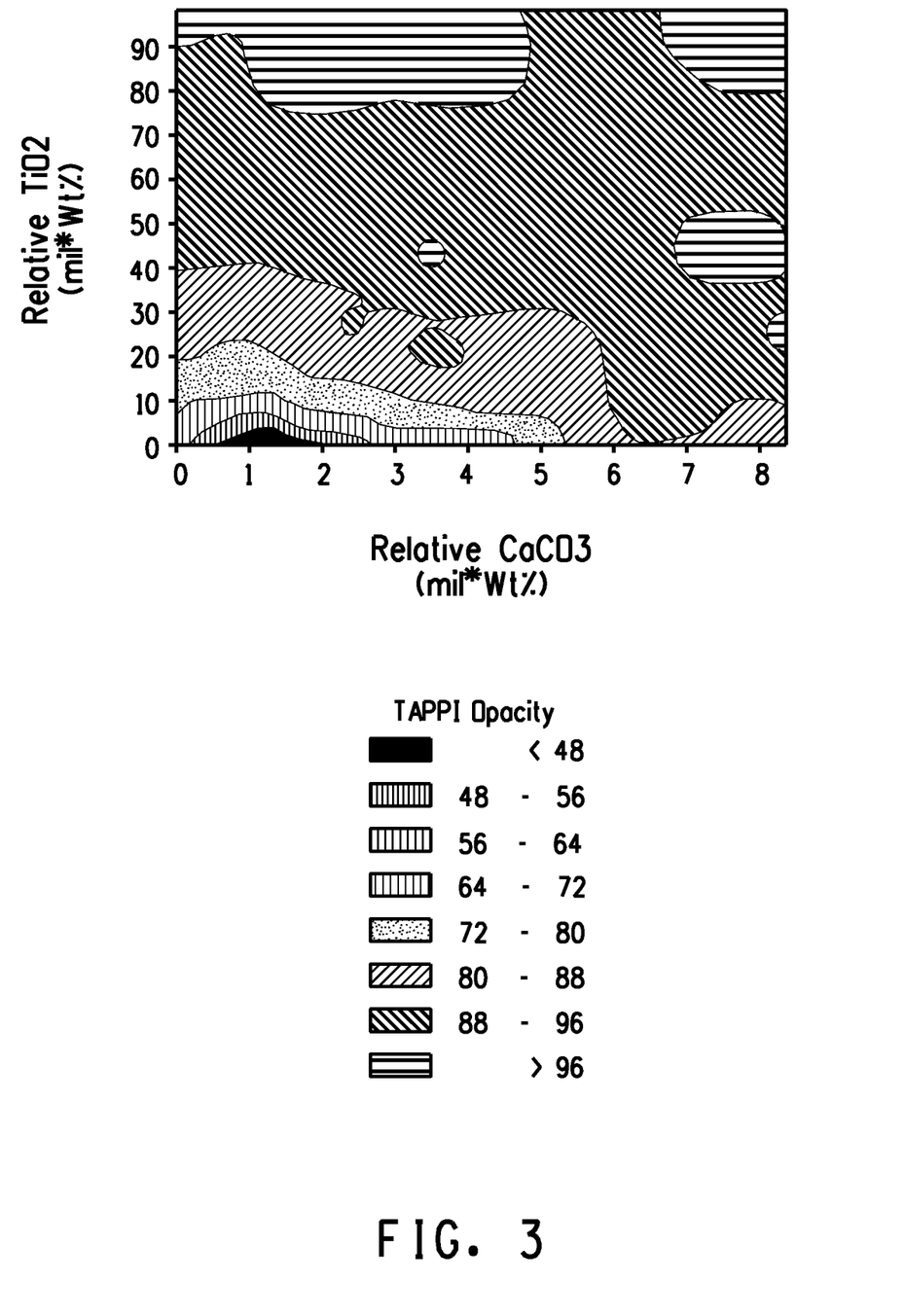
FIG. 3 illustrates an opacity contour plot of LDPE matrices having specific titanium dioxide and calcium carbonate concentrations.
Figure 7:
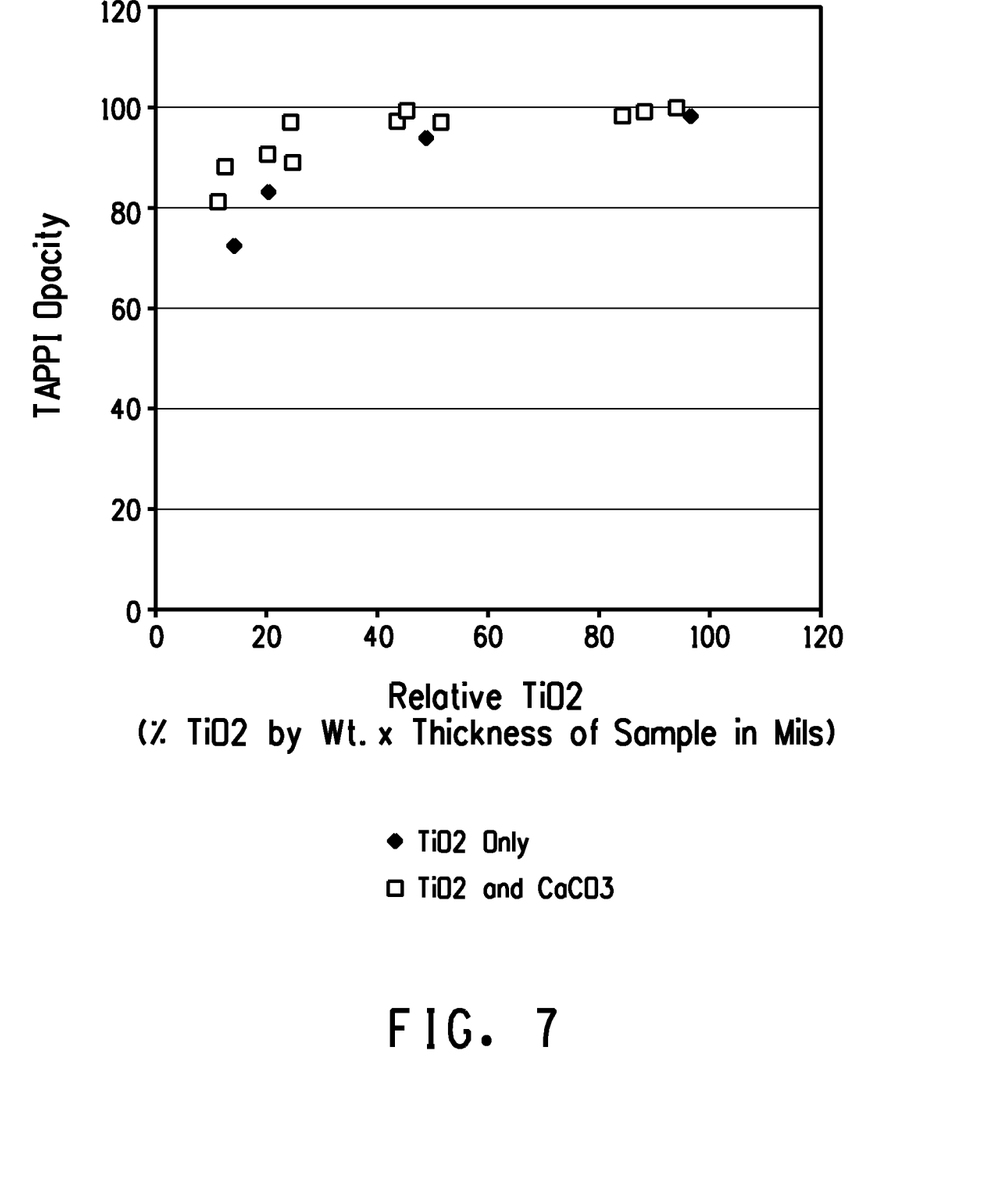
FIG. 7 illustrates TAPPI Opacity of LDPE matrices including titanium dioxide and/or calcium carbonate.
Figure 8:
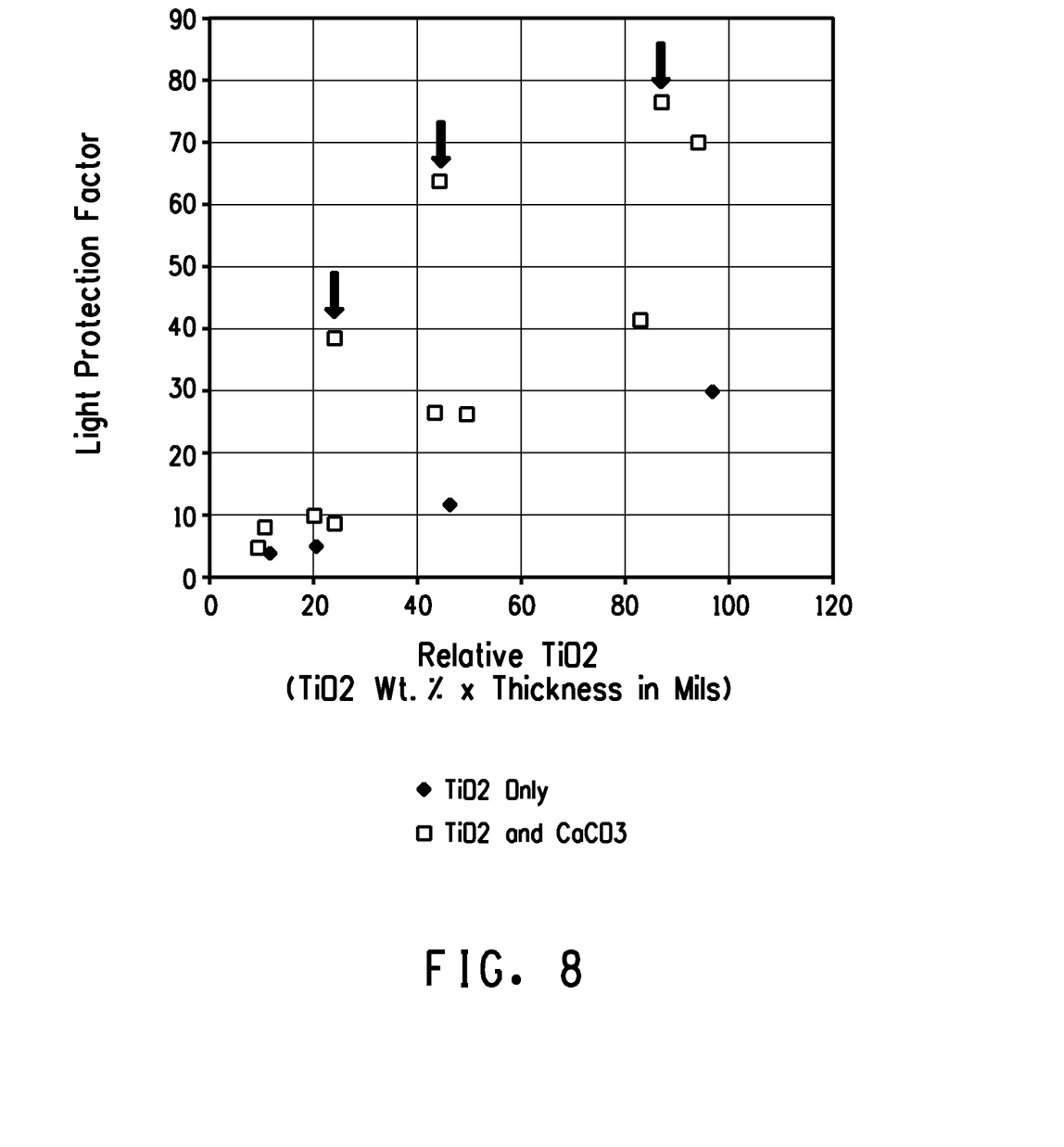
FIG. 8 illustrates LPF (Light Protection Factor) of LPDE matrices including titanium dioxide and/or calcium carbonate.
Figure 9:
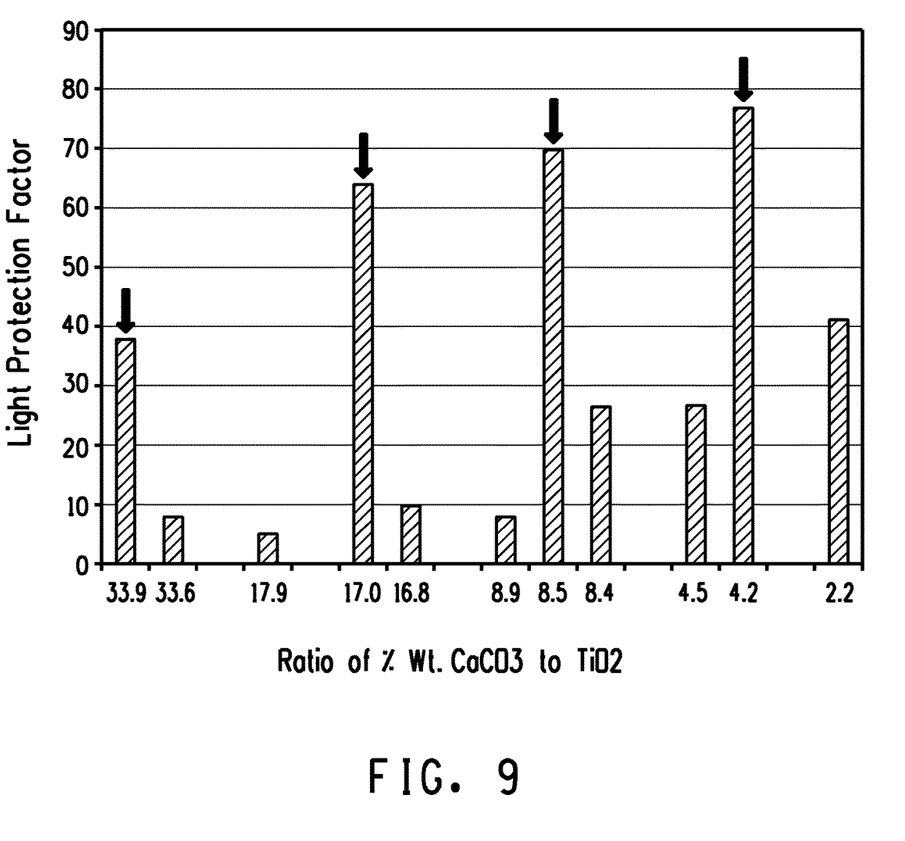
FIG. 9 illustrates a bar diagram of LPF of LPDE matrices including titanium dioxide and/or calcium carbonate.
Figure 10:
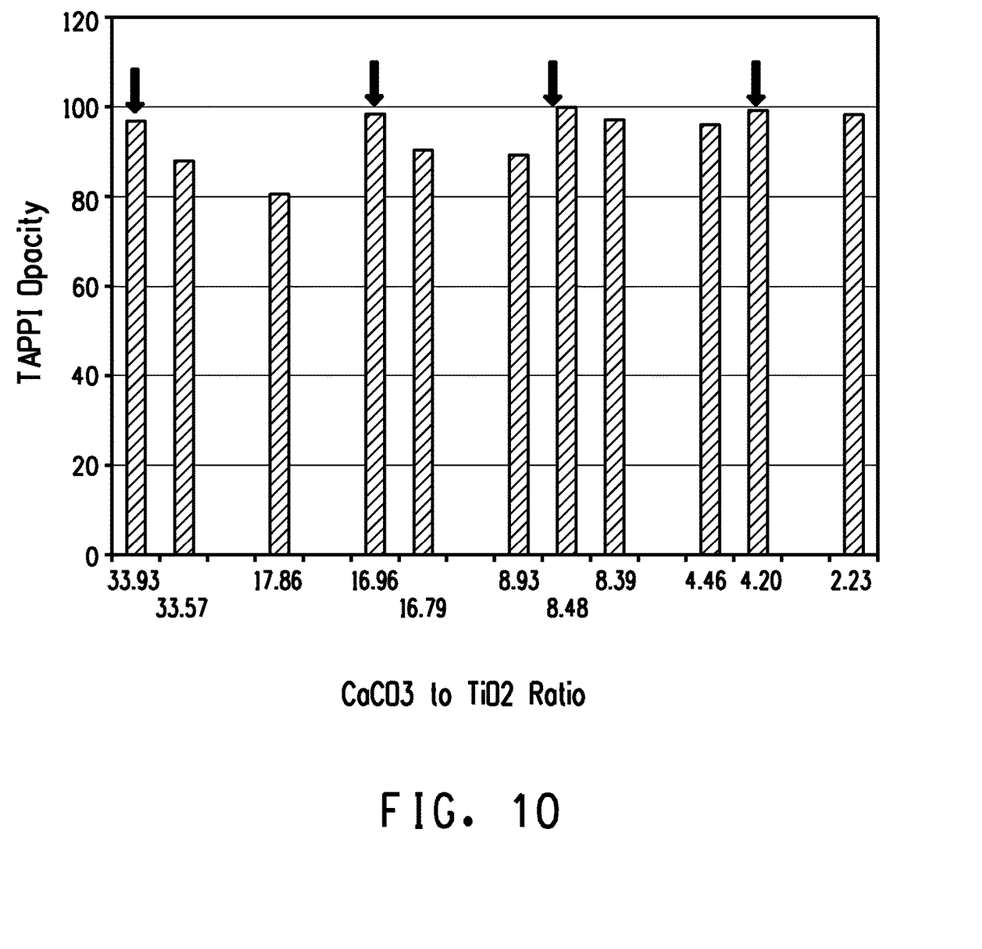
FIG. 10 illustrates a bar diagram of TAPPI Opacity of LPDE matrices including titanium dioxide and/or calcium carbonate.

The relationship of measuring light transmitted through a package and measuring photo-oxidation of one or more light sensitive entities within the package is not clearly understood. Typically, a material having high opacity (and or low light transmittances) has been thought to enhance the protection of food spoilage. Opacity is a quality of a material that does not allow light to pass through it. Higher transmittance typically results in lower opacity and vice versa. FIG. 1 illustrates opacity of a LPDE sheet increases when calcium carbonate concentrations increases specifically 2 to 4% by weight and there is no addition of titanium dioxide used. FIG. 2 illustrates opacity of a LPDE sheets increases when titanium dioxide concentrations increases specifically 0.1 to 1 wt. % and there is no addition of calcium carbonate. Titanium dioxide is nearly ten-fold more efficient than calcium carbonate at enhancing the TAPPI Opacity of a LPDE sheet (matrix). FIG. 3 and FIG. 7 illustrates increases in opacity of LPDE sheets including both calcium carbonate and titanium dioxide. As shown in FIG. 3 and FIG. 7, LPDE sheets having mixtures of calcium carbonate and titanium dioxide have increasing opacity as the amount of titanium dioxide increases illustrating the addition of calcium carbonate does not result in a substantial increase in the opacity of an LPDE sheet when mixed with titanium dioxide. Please refer to the example section for a description of the experiments performed, data generated, and the formation of the figures.

Measuring the LPF of Materials

However, opacity measurements may not accurately measure a material's ability to protect a substance that it covers from photo-oxidation. The current invention is focused on identifying new materials that protect the photo-oxidation of entities such as riboflavin, curcurim, myoglobin, chlorophyll (all forms), vitamin A, and erythrosin. Other photo-oxidation sensitive entities that may be used in the present invention include those found in foods, pharmaceuticals, biological materials such as proteins, enzymes, and chemical materials. The rate of photo-oxidation of one or more light sensitive entitles is referred to as the "light protection factor" or "LPF" and is unlike opacity and/or light transmittance measurements. LPF is the time required for half of a light sensitive entity concentration to undergo photo-oxidation. Hence, a material having a high LPF value used to package one or more light sensitive entity may be present in light longer before photo-oxidation of the light sensitive entity occurs than a material having a low LPF value. Surprisingly, applicants discovered: 1) there is no direct correlation between LPF values and opacity (light transmission) values of packaging materials, and 2) packaging materials having specific concentrations of calcium carbonate and titanium dioxide have extremely high LPF values. A detailed description of measuring LPF is further described in published patent application numbers WO2013/163421 titled, "Methods for Determining Photo Protective Materials" and WO2013/162947 titled, "Devices for Determining Photo Protective Materials incorporated herein by reference. Additional information may be found in the example section of this patent application.

Figure 5:
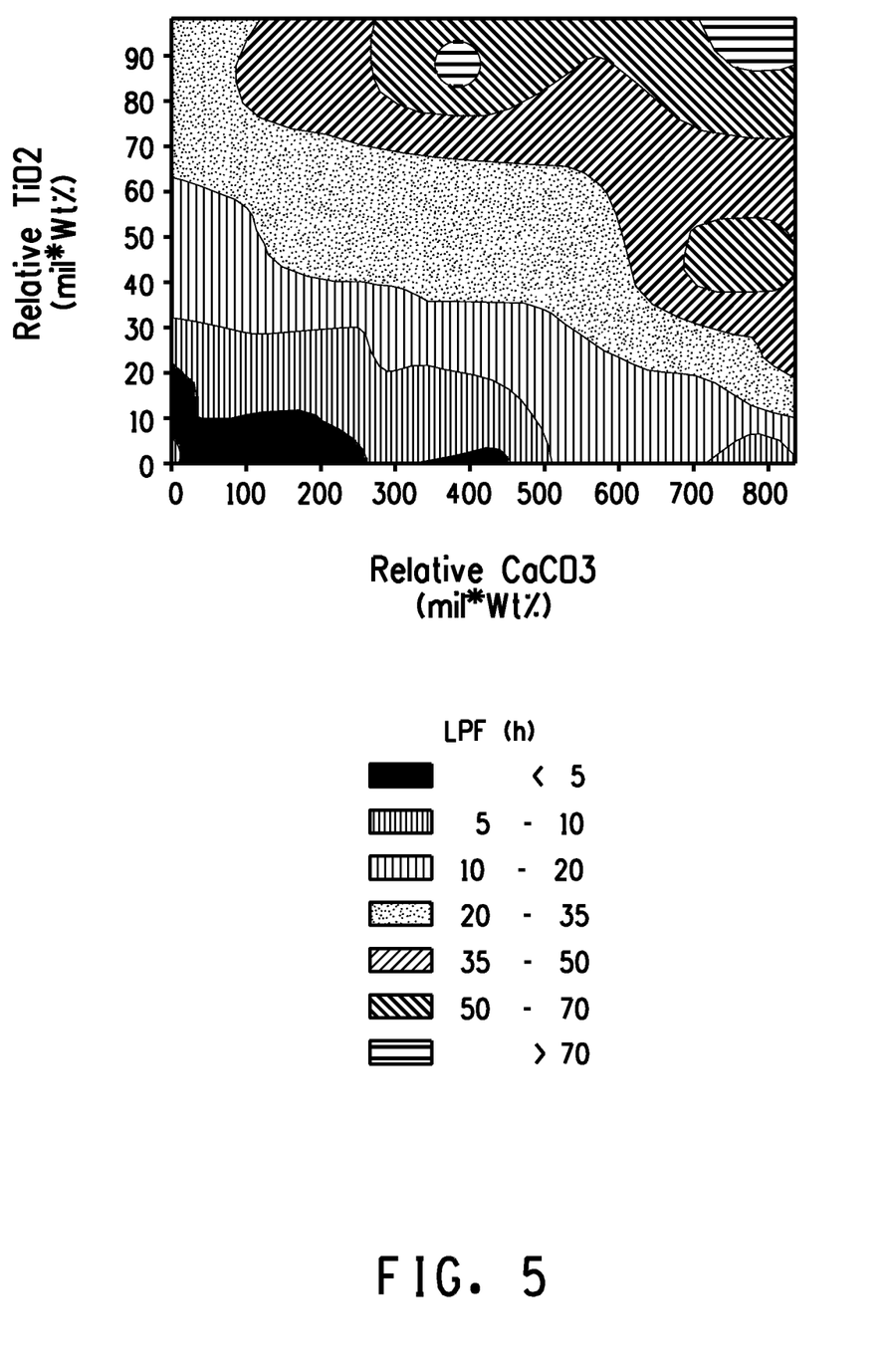
FIG. 5 illustrates Light Protection Factor (LPF) versus mixtures of titanium dioxide and calcium carbonate.
Figure 6:
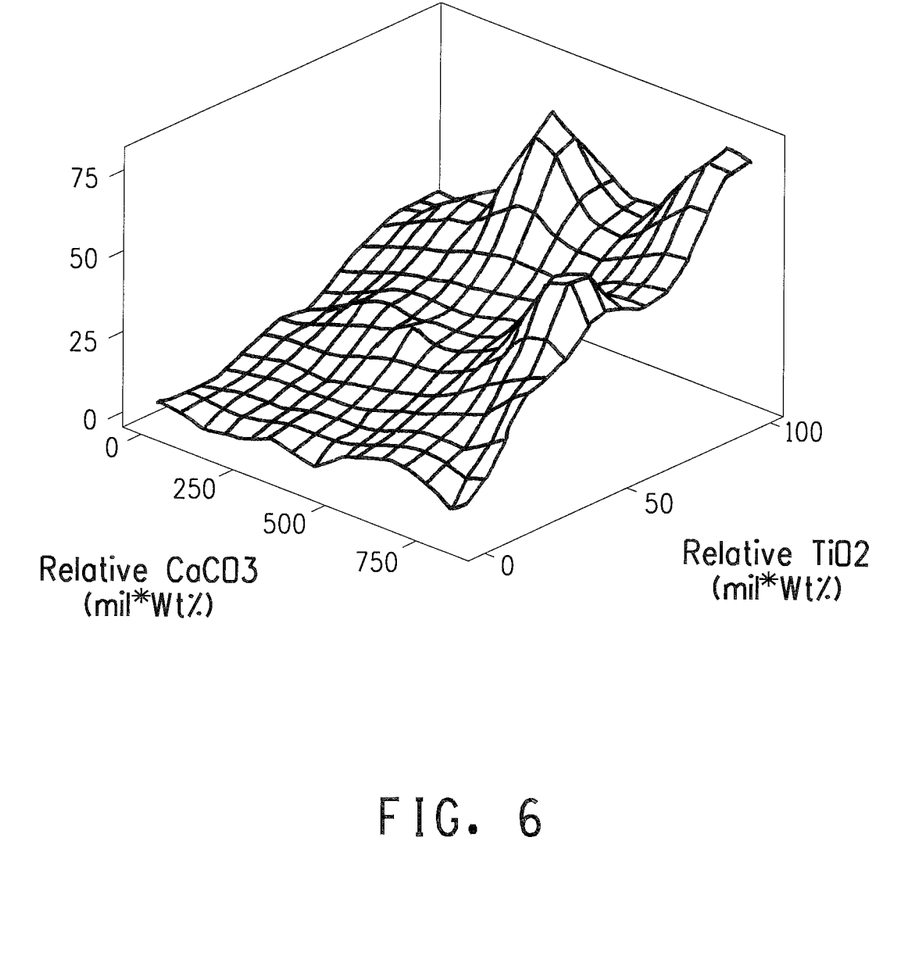
FIG. 6 illustrates a three dimensional representation of FIG. 5.

As mentioned, unexpected and surprising LPF values of packaging materials including mixtures of titanium dioxide and calcium carbonate were identified. FIG. 5 and FIG. 6, and the chart below, illustrate three LPDE sheets with different mixtures of titanium dioxide and calcium carbonate tested to determine the LPF values of these packaging materials. The LPF values were much higher than expected and did not correspond with opacity measurements of the materials illustrated in FIG. 1 through FIG. 3 and FIG. 8 through FIG. 10. In other words, simply preventing light passing through a material does not prevent photo-oxidation of light sensitive entities.

The packaging materials of the present invention comprise a relative part of $CaCO_3$ to the relative part of $TiO_2$. The relative calcium carbonate is defined as the % wt. of the material multiplied by the thickness of the layer containing the material in mils (ex. Relative $CaCO_3$ of 800 could be 20% $CaCO_3$ by weight in a 40 mil thick layer or 40% by wt. in a 20 mil layer of packaging construction), i.e. when the ratio of $CaCO_3$ to $TiO_2$ by wt., is 4.5, 8.6 and 17.1, the LPF values is greater than 60. The invention refers to ratio of mineral filler to titanium dioxide preferably $CaCO_3$ (preferred mineral filler):$TiO_2$ ratio. One embodiment of the invention refers to preferred ratios in the range of 4.5, 8.6 and 17.1 for light protection performance for any given thickness.

Materials of the present invention may be used to form packages. The preferred packages of the present invention are thin walled cartons, for example milk cartons, having a thickness of 0.010 inches or greater, preferably between 0.010 and 0.040 inches, more preferably between 0.020 to 0.040 inches. The preferred packages typically have a TAPPI Opacity greater than 20, greater than 30, greater than 40, greater than 50, greater than 60, greater than 70, greater than 80 but less than 100.

Titanium Dioxide

Treated Pigment:

It is contemplated that any inorganic pigment may be used in the present invention. By inorganic pigment it is meant an inorganic particulate material that becomes uniformly dispersed throughout a polymer melt, and imparts color and opacity to the polymer melt. Some examples of inorganic pigments include but are not limited to ZnO, and $TiO_2$. Fillers used in the present invention include $CaCO_3$, $BaSO_4$, silica, talc or clay. The preferred filler is $CaCO_3$ and the preferred inorganic pigment is titanium dioxide particles.

In particular, titanium dioxide is an especially useful pigment in the processes and products of this disclosure. Titanium dioxide ($TiO_2$) pigment useful in the present disclosure may be in the rutile or anatase crystalline form. It is commonly made by either a chloride process or a sulfate process. In the chloride process, $TiCl_4$ is oxidized to $TiO_2$ pigments. In the sulfate process, sulfuric acid and ore containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the teachings of which are incorporated herein by reference. The pigment may be a pigment or nanoparticle.

By "pigment" it is meant that the titanium dioxide pigments have an average size of less than 1 micron. Typically, the pigments have an average size of from about 0.020 to about 0.95 microns, more typically, about 0.050 to about 0.75 microns and most typically about 0.075 to about 0.60 microns, as measured by Horiba LA300 Particle Size Analyzer The titanium dioxide pigment may be substantially pure titanium dioxide or may contain other metal oxides, such as silica, alumina, zirconia. Other metal oxides may become incorporated into the pigments, for example, by co-oxidizing or co-precipitating titanium compounds with other metal compounds. If co-oxidized or co-precipitated up to about 20 wt. % of the other metal oxide, more typically, 0.5 to 5 wt. %, most typically about 0.5 to about 1.5 wt. % may be present, based on the total pigment weight.

The titanium dioxide pigment may also bear one or more metal oxide surface treatments. These treatments may be applied using techniques known by those skilled in the art. Examples of metal oxide treatments include silica, alumina, and zirconia among others. Such treatments may be present in an amount of about 0.1 to about 20 wt. %, based on the total weight of the pigment, typically about 0.5 to about 12 wt. %, more typically about 0.5 to about 3 wt. %.

The inorganic pigment may have a surface area of about 30 to about 75 $m^2/g$; more typically about 40 to about 70 $m^2/g$; and still more typically about 45 to about 65 $m^2/g$, and still more typically about 50 to about 60 $m^2/g$.

The present invention may also use Nano-$TiO_2$ within a composition between about 0.1 to about 50, or about 0.5 to about 30, or about 0.5 to about 10, or about 0.5 to 2 wt. % (based on the total weight of the composition). The nano-$TiO_2$ can have a mean size distribution less than or equal to about 125 nm, or ≤100 nm, or ≤50 nm, or ≤40 nm, or ≤20 nm. The nano-$TiO_2$ is preferably coated with an acid, a silicon compound, another metal oxide, or combinations of two or more thereof. The coating can be in the range of about 0.1 to about 25 wt. %, or 0.1 to about 10 wt. %, or about 0.3 to about 5 wt. %, or about 0.7 to about 2 wt. %. Nano-$TiO_2$ can be commercially available or produced by any means known to one skilled in the art such as that disclosed in U.S. Pat. No. 6,667,360. Phosphoric acid, metal phosphate, metal halide, metal carbonate, metal sulfate, or combinations of two or more thereof can be used to control the crystallinity, amorphous content, or millability of the nano-$TiO_2$. The metal can be sodium, potassium, aluminum, tin, or zinc. Surface reactivity of the particles can also be controlled by coating with a surface agent such as metal oxide, an acid, or silane as disclosed above.

The composition may further include plasticizers, optical brighteners, adhesion promoters, stabilizers (e.g., hydrolytic stabilizers, radiation stabilizers, thermal stabilizers, and ultraviolet (UV) light stabilizers), antioxidants, ultraviolet ray absorbers, anti-static agents, colorants, dyes or pigments, delustrants, fillers, fire-retardants, lubricants, reinforcing agents (e.g., glass fiber and flakes), processing aids, anti-slip agents, slip agents (e.g., talc, anti-block agents), and other additives.

$TiO_2$ can be present in the composition between about 0.1 to about 80, or about 0.5 to about 30, or about 0.5 to about 10 or about/preferred 1.5 to 3 wt. % (based on the total weight of the composition). $TiO_2$ can have a mean size distribution less than or equal to about 350 nm or ≤250, or ≤125 nm, or ≤100 nm, or ≤50 nm, or ≤40 nm, or ≤20 nm.

TiO$_2$ is preferably coated with a carboxylic acid containing material, a polyalcohol, an amide, an amine, a silicon compound, another metal oxide, or combinations of two or more thereof. The coating can be in the range of about 0.1 to about 25 wt. %, or 0.1 to about 10 wt. %, or about 0.3 to about 5 wt. %, or about 0.7 to about 2 wt. %. The acid can be a carboxylic acid such as, for example, adipic acid, terephthalic acid, lauric acid, myristic acid, palmitic acid, stearic acid, oleic acid, salicylic acid, and ester or salt thereof. Examples of silicon compound can be a silicate or organic silane or siloxane including silicate, organoalkoxysilane, aminosilane, epoxysilane, and mercaptosilane such as hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane, octadecyltriethoxysilane, N-(2-aminoethyl) 3-aminopropylmethyl dimethoxysilane, N-(2-aminoethyl) 3-aminopropyl trimethoxysilane, 3-aminopropyl triethoxysilane, 3-glycidoxypropyl trimethoxysilane, 3-glycidoxypropyl methyldimethoxysilane, 3-mercaptopropyl trimethoxysilane and combinations of two or more thereof. Examples of metal oxides include Al$_2$O$_3$, SiO$_2$, ZrO$_2$, or combinations of two or more thereof.

Polymer Composition/Polymer Melts

In a polymer composition/melt, the melt-processable polymer that can be employed together with the treated particle of this disclosure comprises a high molecular weight polymer. Polymers useful in this disclosure are high molecular weight melt processable polymers. By "high molecular weight" it is meant to describe polymers having a melt index value of 0.01 to 50, typically from 2 to 10 as measured by ASTM method D1238-98. By "melt-processable," it is meant a polymer that can be extruded or otherwise converted into shaped articles through a stage that involves obtaining the polymer in a molten state. Polymers that are suitable for use in this disclosure include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate; vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyesters and chlorinated polyesters; polyethers; acetal resins; polyimides; and polyoxyethylenes. Mixtures of polymers are also contemplated. Polymers suitable for use in the present disclosure also include various rubbers and/or elastomers, either natural or synthetic polymers based on copolymerization, grafting, or physical blending of various diene monomers with the above-mentioned polymers, all as generally known in the art. Typically, the polymer may be selected from the group consisting of polyolefin, polyvinyl chloride, polyamide and polyester, and mixture of these. More typically used polymers are polyolefins. Most typically used polymers are polyolefins selected from the group consisting of polyethylene, polypropylene, and mixture thereof. A typical polyethylene polymer is low density polyethylene and linear low density polyethylene.

Other Additives

A wide variety of additives may be present in the polymer composition produced by the process of this disclosure as necessary, desirable or conventional. Such additives include polymer processing aids such as fluoropolymers, fluoroelastomers, etc., catalysts, initiators, antioxidants (e.g., hindered phenol such as butylated hydroxytoluene), blowing agent, ultraviolet light stabilizers (e.g., hindered amine light stabilizers or "HALS"), organic pigments including tinctorial pigments, plasticizers, antiblocking agents (e.g. clay, talc, calcium carbonate, silica, silicone oil, and the like) leveling agents, flame retardants, anti-cratering additives, and the like.

Preparation of the Polymer Compositions that Form Plastic Articles

TiO$_2$ particles of the present invention may be added to the polymer compositions of the present invention by both dry and wet mixing. In wet mixing, the particles may be turned in to a slurry or dissolved in a solvent and subsequently mixed with the other ingredients. In one embodiment of the disclosure, the treated particle may be contacted with a first high molecular weight melt processable polymer. Any melt compounding techniques, known to those skilled in the art may be used. Generally, the treated particle, other additives and melt processable polymer are brought together and then mixed in a blending operation, such as dry blending, that applies shear to the polymer melt to form the particle containing, more typically pigmented, polymer. The melt processable polymer is usually available in the form of particles, granules, pellets or cubes. Methods for dry blending include shaking in a bag or tumbling in a closed container. Other methods include blending using agitators or paddles. Treated particle, and melt-processable polymer may be co-fed using screw devices, which mix the treated particle, polymer and melt-processable polymer together before the polymer reaches a molten state. Alternately, the components may be fed separately into equipment where they may be melt blended, using any methods known in the art, including screw feeders, kneaders, high shear mixers, blending mixers, and the like. Typical methods use Banbury mixers, single and twin screw extruders, and hybrid continuous mixers. Processing temperatures depend on the polymer and the blending method used and are well known to those skilled in the art. The intensity of mixing depends on the polymer characteristics. The treated particle containing polymer composition produced by the process of this disclosure is useful in production of shaped articles. The amount of particle present in the particle-containing polymer composition and shaped polymer article will vary depending on the end use application. However, typically, the amount of particle in the polymer composition ranges from about 30 to about 90 wt. %, based on the total weight of the composition, preferably, about 50 to about 80 wt. %. The amount of particle in an end use, such as a shaped article, for example, a polymer film, can range from about 0.01 to about 20 wt. %, and is preferably from about 0.1 to about 15 wt. %, more preferably 5 to 10 wt. %. A shaped article is typically produced by melt blending the treated particle containing polymer which comprises a first high molecular weight melt-processable polymer, with a second high molecular weight meltprocessable polymer to produce the polymer that can be used to form the finished article of manufacture. The treated particle containing polymer composition and second high molecular weight polymer are melt blended, using any means known in the art, as disclosed hereinabove. In this process, twin-screw extruders are commonly used. Co-rotating twin-screw extruders are available from Werner and Pfleiderer. The melt blended polymer is extruded to form a shaped article. Inorganic particles treated in accordance with this disclosure are capable of being dispersed throughout the polymer melt. Typically the treated inorganic particle can be uniformly dispersed throughout the polymer melt. Such particles may exhibit some minor degree of clumping together within the polymer. A minor amount of the particles may also migrate to the surface of the polymer melt but any such migration would not be to a degree sufficient for the particle to qualify as a surface active material such as an antiblock agent. In one embodiment, the disclosure relates to a polymer composition that can be used as a masterbatch. When used as a masterbatch, the polymer can provide both opacity and viscosity attributes to a polymer blend that can be utilized to form shaped articles. The examples which follow, description of illustrative and typical embodiments of the present disclosure are not intended to limit the scope of the disclosure. Various modifications, alternative constructions and equivalents may be employed without departing from the true spirit and scope of the appended claims. In one embodiment, the polymer films may be substantially free of other conventional colorants and contain solely the treated titanium dioxide pigments of this disclosure.

EXAMPLES

Method of Making Packages

A $CaCO_3$—$TiO_2$-polyethylene mixture is formed when 139.7 grams of DuPont 20 (low density polyethylene resin; density 0.92 g/cm$^3$; MFR (190° C./2.16 kg)=1.9 g/10 min.) was mixed with 95 grams of 50% $CaCO_3$ concentrate and 5.6 grams of 50% $TiO_2$ concentrate. This composition yielded a 25% $CaCO_3$ and 1.5% $TiO_2$ by wt. material with the preferred $CaCO_3$/$TiO_2$ ratio of 16.5.

This mixture was then compounded on a two roll mill having a temperature of 105° C. at the front roll, and 115° C. at the rear roll. Both front and back rolls have doctor blades installed. The front and back rolls have a gap of 0.09 cm. DuPont 20 polyethylene was then banded at 635/635 cm per minute per front and back roll speeds. This mixture was added at 914/914 cm per minute front and back roll speeds and then two cuts were made. The Doctor Blades were used to cut the mixture by pulling the mixture, which was now a compounded polyethylene sheet, off the roll. Next, the compounded polyethylene sheet was balled up and then placed back in the mill gap. The front and back roll speeds were increased to 1370.1066 cm per minute and then ten (10) cuts were made. The polyethylene sheets were cut into 5 cm×10 cm strips and stored in white envelops or aluminum foil.

Using a Carver press, the strips obtained from the two roll mill operation are then manipulated in the following manner to yield smooth surface material ranging in thickness of 0.63 to 0.89 mm. Next the top and bottom platens of the hot press were set to approximately 163-177 OF. Then a press out stack was made having the following layers: an aluminum plate, a photographic feral plate, mylar, a polyethylene sheet of the present invention, mylar, template cut outs, a photographic feral plate, and an aluminum plate. The press out stack was then placed into the hot press. Approximately 3450 bars of pressure were applied for about 2 to 4 minutes, or until the time interval between the automatic pressure adjustments decreased. The stack was removed and placed into a cold press for 1 to 2 minutes. After pressing, the stack was turned into a pressed sample, the pressed sample was removed from the cold press, labeled, and then stored in aluminum foil, or white envelopes, in a dark place.

The pressed sample was then placed in a light protection measurement device called OPTIMETRIX™. A detailed description of measuring LPF is further described in published patent application numbers WO2013/163421 titled, "Methods for Determining Photo Protective Materials" and WO2013/162947 titled, "Devices for Determining Photo Protective Materials incorporated herein by reference. OPTIMETRIX™ was used to simultaneous expose and analyze the entity sensitive to photo-oxidation, riboflavin, and identify an LPF value. OPTIMETRIX™ has the ability to deliver a constant irradiance of 0.765 watts/cm^2 at approximately 4 centimeters to the light sensitive entity (typically in solution form) containing 15 ppm riboflavin (buffered for pH of 7.4) for a Xe arc lamp. The length of exposure time is 40 minutes. A typical exposure (with no filter) was near 200,000 to 250,000 lux at the sample position. The riboflavin solution cell had a volume of 15 milliliters and a path length of 50 centimeters with a diameter of 1.9 cm (approximately 60 to 70 lumens at the cell surface with no wavelength filter present). The cell was jacketed with cooling elements to maintain a constant temperature. For the experiments conducted, the temperature setting was 4° C. The contents of the cell were continuously stirred during exposure and left open to the atmosphere. It was assumed that the solution is saturated with oxygen. The riboflavin solution was 15 ppm in buffered solution of pH 6.7 and stored at 4° C. in aluminum foiled lined container prior to use. The innovative apparatus described herein simultaneously exposed and measured the riboflavin solution. The measurement technique involves the use of a UVNis spectrometer to observe the absorbance of riboflavin. The innovative technique monitored the absorbance at 445 nm in one minute time intervals. The data were collected, and with an assumption of first order kinetics, calculated a rate constant (min-1) based on the slope of absorbance decay at 445 nm during 40 minutes of exposure. This slope was converted into a "light protection factor", henceforth called LPF, by inversing the slope value, multiplying by 0.693 and dividing the product by 60 to convert LPF units into hours. The preferred composition describe had an LPF value of 63. The LDPE matrices described in the figures were created using this method. Another example, 139.7 grams of DuPont 20 (low density polyethylene resin (LDPE); density 0.92 g/cm^3; MFR (190° C./2.16 kg)=1.9 g/10 min.) is mixed with 49.5 grams of 50% $CaCO_3$ concentrate and 11.0 grams of 50% $TiO_2$ concentrate. This composition yields a 13% $CaCO_3$ and 3.0% $TiO_2$ by wt. material with the preferred $CaCO_3$/$TiO_2$ ratio of 4.5. The LPF value resulting from the preferred ratio of 4.5 is 76. TAPPI Opacity measurements were obtained using conventional methods.

Comparative Example 1 Opacity Measurements

FIG. 1 illustrates opacity measurements of LDPE sheets having increasing concentrations of calcium carbonate (without the addition of titanium dioxide), the x axis is described as the "relative calcium carbonate". This term is defined as the % by weight of the calcium carbonate filler multiplied by thickness of the overall LDPE sheet. Hence, the metric TAPPI opacity is determined by the amount of material within a certain path length, i.e. thickness and % by weight of calcium carbonate. A large amount of $CaCO_3$ is required to make an impact on the opacity of a specific LDPE matrix. For example, to achieve a value of near 80% opacity requires the sample to contain 25% by wt. CaCO$_3$ in an approximately 31 mil sample (relative CaCO$_3$ of 774).

Comparative Example 2 Opacity Measurements

Opacity of samples typically involves the measurement of light reflection from a sample which has placed over two different surfaces. The surfaces are standardized white and black tile. The ratio of the reflected light (black reflection over white reflection; sometimes referred to as contrast ratio) from each surface is then termed as the "opacity" or "translucency". The term "translucent" is necessary since 100% opacity implies no translucency of the sample. This embodiment refers to plastic articles which exhibit a certain level of translucency. The opacity metric, more specifically TAPPI opacity, as measured according to TAPPI test method T425, serves as the response for understanding the relationship of sample thickness and concentration of light protecting material within the translucent plastic sample. Hence, the relationship of TAPPI opacity is a function of the translucent sample thickness times the % weight of either calcium carbonate or titanium dioxide.

For example, translucent samples containing only TiO$_2$ were made at similar, but not identical thicknesses and different levels of TiO$_2$ by weight were made. The opacity values of these samples were recorded.

FIG. 2 illustrates opacity measurements of LPDE sheets having increasing titanium dioxide concentrations (without the addition of calcium carbonate). Titanium dioxide significantly enhances the TAPPI opacity of LDPE sheets requiring only from 0.1 to 1% wt. titanium dioxide per the sheet. In comparison (FIG. 1), calcium carbonate requires from 2 to 4% wt. of per sheet to see a significant enhancement of TAPPI opacity demonstrating that titanium dioxide is nearly ten-fold more efficient than calcium carbonate enhancing an LDPE sheet. Therefore, opacity is more greatly impacted by the presence of titanium dioxide and not calcium carbonate. Please see FIG. 7. Calcium carbonate has a minor role in enhancing opacity when mixed with titanium dioxide.

Comparative Example 3 Opacity Measurements

Figure 4:
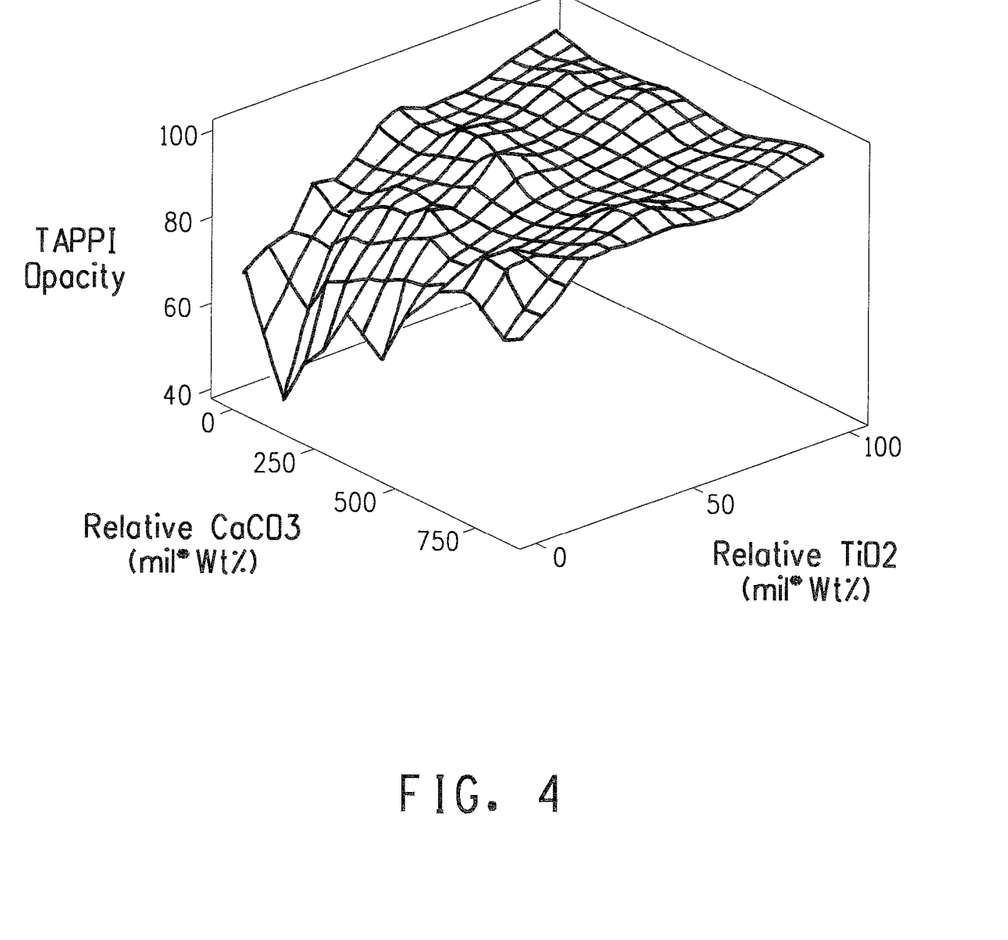
FIG. 4 illustrates a three dimensional representation of FIG. 3.

FIG. 3 and FIG. 7 illustrates opacity measurements of LPDE sheets having increasing amounts of calcium carbonate and titanium dioxide concentrations. FIG. 3 illustrates that the opacity of LPDE sheet increases as the concentration of titanium dioxide increases when the thickness of the sheet is constant corresponding to the teaching of Kulbelka-Munk theory of refractive index difference. FIG. 3 illustrates that as taught by the Kulbelka-Munk theory, there are no preferred calcium carbonate: titanium dioxide blends having sharp contour islands that would indicate enhanced opacity performance. FIG. 4 is a three dimensional representation of FIG. 3, typically called a contour plot or the 3D wire frame plot, further illustrates titanium dioxide causing a rapid rise in opacity as the amount of the material is increased but blending titanium and calcium carbonate does not result in enhanced opacity performance.

Example 1 LPF Measurements

Unexpected and surprising LPF values were observed when materials including mixtures of titanium dioxide and calcium carbonate. As observed in FIG. 5, FIG. 6, FIG. 8 and in the FIG. 9, LDPE matrices with different mixtures of titanium dioxide and calcium carbonate were tested and each sheet provided LPF values were much higher than their respective TAPPI Opacity (Compare FIG. 7, though FIG. 10).

What is claimed is:
1. A composition comprising:
 a) a melt processable resin;
 b) titanium dioxide particles; and
 c) CaCO$_3$ filler,
 wherein the composition comprises a weight ratio of the CaCO$_3$ filler to the titanium dioxide particles selected from the group consisting of 17:1, 8.5:1, and 4.2:1.
2. The composition of claim 1 wherein the composition has an LPF value of greater than 60.
3. The composition of claim 1 wherein the melt processable resin is selected from the group consisting of polyethylene, polypropylene, polystyrene, polyvinylchloride, polymethylacrylate, acrylonitrile butadiene styrene, polycarbonate, polyethylene terephthalate, polybutylene terephthalate, polyamide, polyphenylene sulfide, polyacetal and or blends thereof.
4. The composition of claim 3, wherein the melt processable resin is polyethylene.
5. The composition of claim 4, wherein the polyethylene is a low density polyethylene.
6. The composition of claim 2, wherein TiO$_2$ particles have a mean size distribution of less than or equal to about 350 nm.
7. The composition of claim 6, wherein the TiO$_2$ particles have a mean size distribution of less than or equal to 250 nm.
8. The composition of claim 2 wherein the filler material has a particle size range between 20 and 1000 microns.
9. The composition of claim 1 wherein the composition is in the form of a package.
10. The composition of claim 1 wherein the package comprises a milk carton.
11. The composition of claim 10 wherein the milk carton has a wall thickness of between about 0.010 and 0.040 inch.
12. The composition of claim 11 wherein the milk carton has a wall thickness of between about 0.020 and 0.040 inch.
13. The composition of claim 1 wherein the TiO$_2$ particles have a mean size distribution of less than or equal to about 350 nm.
14. The composition of claim 13 wherein the TiO$_2$ particles have a mean size distribution of less than or equal to about 250 nm.
15. The composition of claim 1 wherein the CaCO$_3$ filler material has a particle size range between about 20 and 1000 microns.

* * * * *